United States Patent [19]

Shimoyama et al.

[11] Patent Number: 5,838,590

[45] Date of Patent: Nov. 17, 1998

[54] INFORMATION PROCESSING APPARATUS

[75] Inventors: Noboru Shimoyama; Kazuhisa Kawakami, both of Yokohama, Japan

[73] Assignee: Canon Kabushiki Kaisha, Tokyo, Japan

[21] Appl. No.: 760,352

[22] Filed: Dec. 4, 1996

[30] Foreign Application Priority Data

Dec. 5, 1995 [JP] Japan .................................. 7-316482
Nov. 27, 1996 [JP] Japan .................................. 8-316179

[51] Int. Cl.$^6$ .................................................. G01K 15/00
[52] U.S. Cl. ...................... 702/130; 364/571.03; 347/17; 347/18; 347/19; 347/223; 399/33; 399/69
[58] Field of Search ............................. 364/557, 571.03; 347/17, 18, 19, 223; 399/69, 33; 219/200

[56] References Cited

U.S. PATENT DOCUMENTS

| | | | |
|---|---|---|---|
| 4,496,824 | 1/1985 | Kawai et al. | 347/223 |
| 4,887,092 | 12/1989 | Pekruhn et al. | 347/223 |
| 5,237,338 | 8/1993 | Stephenson | 347/223 |
| 5,307,093 | 4/1994 | Suzuki et al. | 347/17 |
| 5,353,044 | 10/1994 | Nakano et al. | 347/223 |
| 5,485,179 | 1/1996 | Otsuka et al. | 347/17 |
| 5,546,514 | 8/1996 | Nishiyama | 347/16 |
| 5,576,745 | 11/1996 | Matsubara | 347/17 |

*Primary Examiner*—Emanuel Todd Voeltz
*Assistant Examiner*—Hien Vo
*Attorney, Agent, or Firm*—Fitzpatrick, Cella, Harper & Scinto

[57] ABSTRACT

This specification discloses an information processing apparatus in which the temperature of the atmosphere in the apparatus is detected by system temperature detecting means, the temperature of an element on a control substrate is detected by substrate element temperature detecting means, and a preset temperature, the temperature detected by the system temperature detecting means and the temperature detected by the substrate element temperature detecting means are compared with one another and temperature management control based on the result of the comparison is effected.

31 Claims, 14 Drawing Sheets

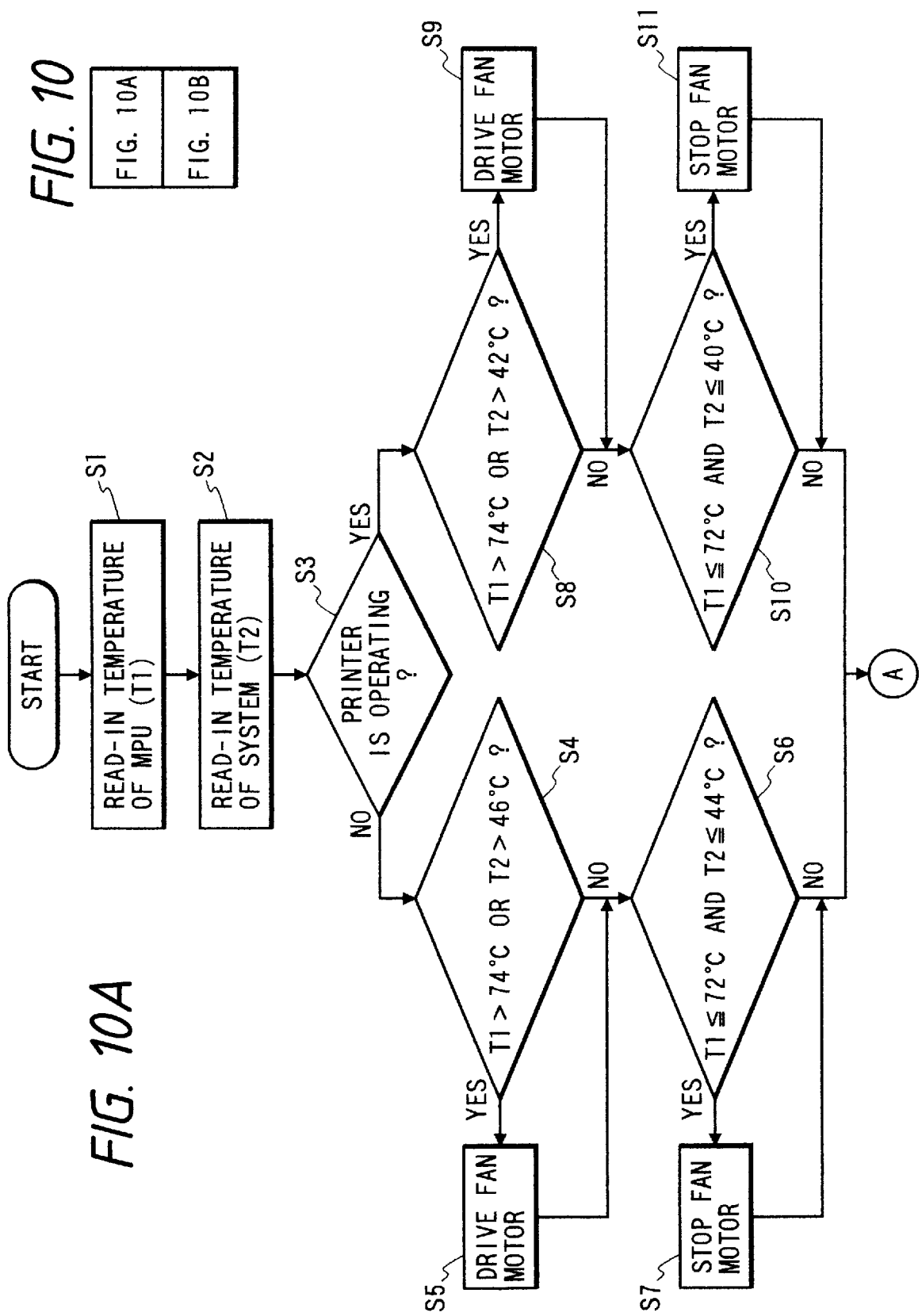

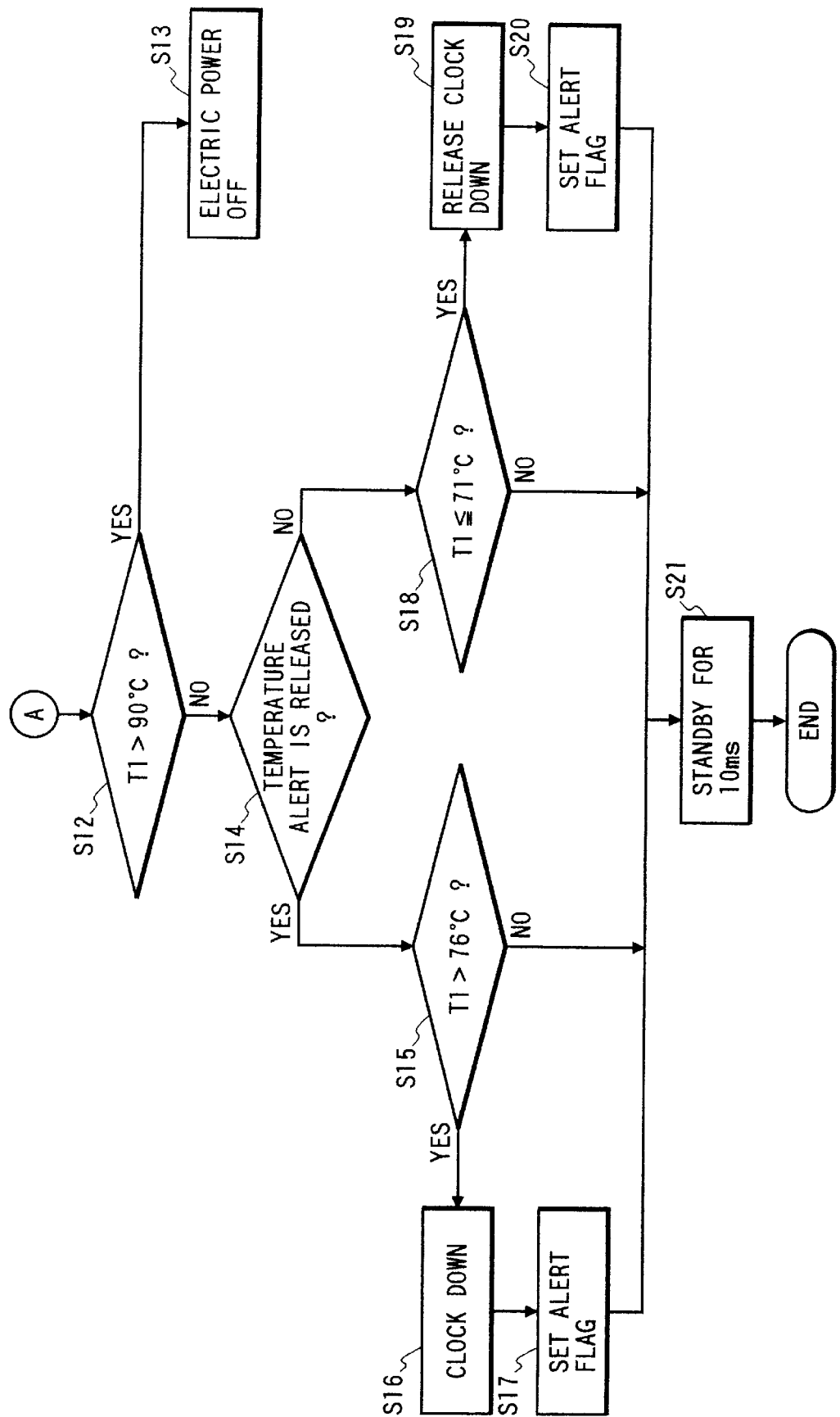

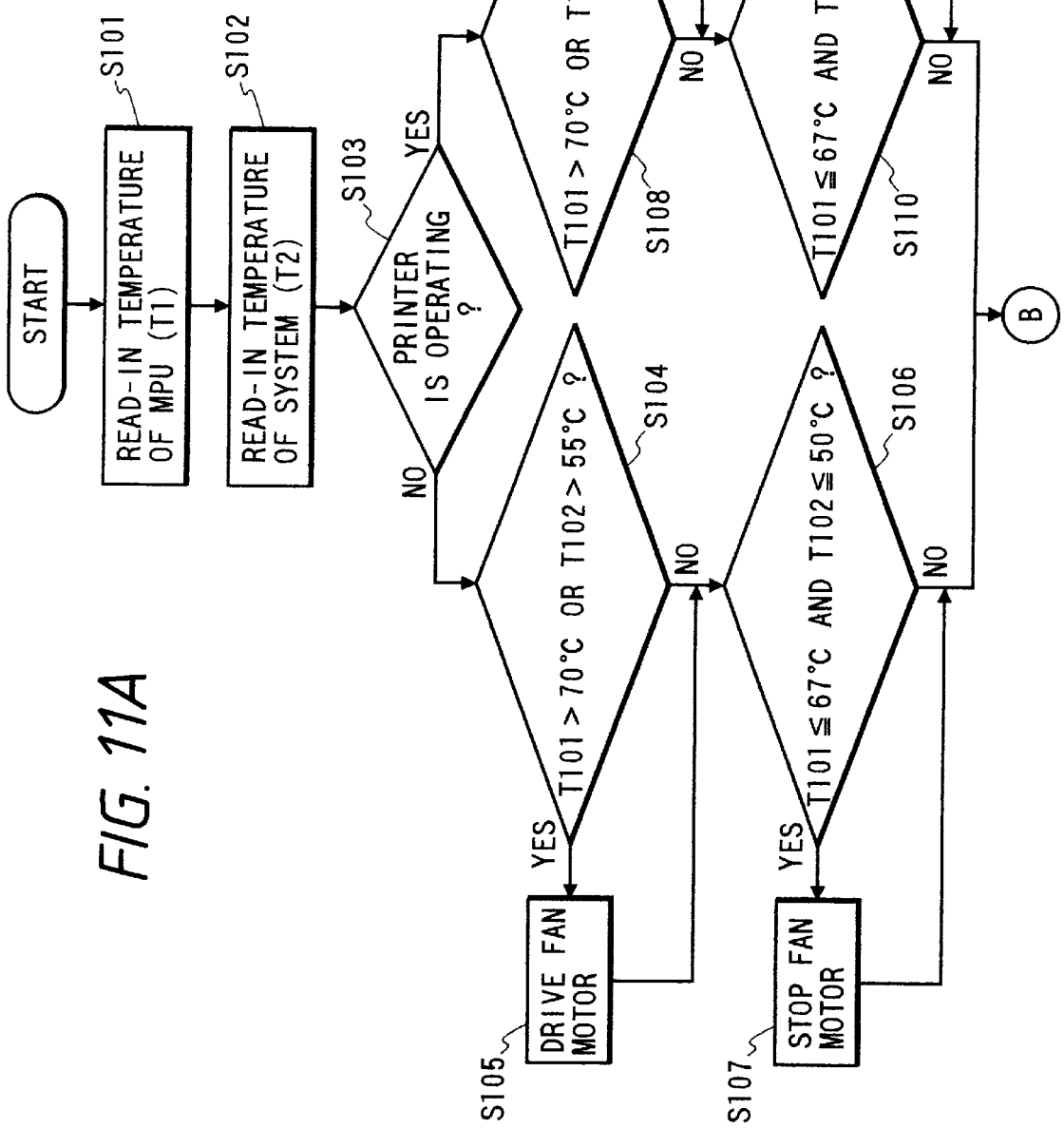

INFORMATION PROCESSING APPARATUS

BACKGROUND OF THE INVENTION

1. Field of the Invention

This invention relates to an information processing apparatus which effects control conforming to the temperature in the apparatus.

2. Related Background Art

In recent years, in the field of information processing apparatuses such as computers and printers containing MPUs (microprocessor units) therein, the heat generation of the MPU has posed a problem with the higher performance of the MPU. Also, on a control substrate, besides the MPU, numerous parts generating heat are mounted and the heat generation of these electrical and electronic parts has caused the bad operation of the electrical and electronic parts themselves or the bad operation of devices mounted in the computer and thus, it has become necessary to control the temperature rise state of the MPU and also control the temperature rise state in the housing of the apparatus.

Particularly, in a computer containing therein a printer of the ink jet type as an example of the information processing apparatus made integral with a printer, the control of the temperature of the atmospheres inside and outside the printer has become important from the viewpoint of the integrity of ink and an ink jet head.

As a conventional countermeasure for radiation used in an information processing apparatus such as such a computer, mention may be made of the installation of a radiating fan by motor drive in the apparatus. Generally in a radiating fan, it is often the case that the driving of the motor thereof is effected in operative association with the ON/OFF operation of the main switch of a body.

In the prior-art information processing apparatus, however, a fan motor is always driven to suppress the temperature rise in the MPU and the housing and therefore, the driving sound of the fan motor is always created and causes noise, and in a portable computer, the power consumption of the fan motor has led to a problem such as the reduced life of a battery.

SUMMARY OF THE INVENTION

The present invention has been made in view of the above-noted problems peculiar to the prior art and an object thereof is to provide an information processing apparatus in which the production of noise from radiating means or the like is reduced and the reduction in the life of a power source resulting from the driving of the radiating means or the like is prevented, and yet the temperature rise in an MPU or the like as an element disposed on an electric substrate and a housing can be suppressed.

Another object of the present invention is to provide an information processing apparatus in which the temperature of the atmosphere in the apparatus is detected by system temperature detecting means, the temperature of an element on a control substrate is detected by element temperature detecting means, and a preset temperature, the temperature detected by the system temperature detecting means and the temperature detected by the element temperature detecting means are compared with one another and temperature management control based on the result of the comparison is effected.

Still another object of the present invention is to provide an information processing apparatus including:

a control substrate on which an element is disposed;

element temperature detecting means for detecting a temperature emitted by the element;

radiating means for reducing the temperature of the atmosphere in the information processing apparatus;

system temperature detecting means for detecting the temperature of the atmosphere in the apparatus; and control means for comparing a predetermined first set temperature and a third set temperature lower than the first set temperature and the temperature detected by the system temperature detecting means with one another, comparing a predetermined second set temperature and a fourth set temperature lower than the second set temperature and the temperature detected by the element temperature detecting means with one another and controlling the driving of the radiating means on the basis of the results of the comparisons.

Yet still another object of the present invention is to provide an information processing apparatus including:

a control substrate on which an element is disposed;

element temperature detecting means for detecting a temperature emitted by the element;

radiating means for reducing the temperature of the atmosphere in the information processing apparatus;

system temperature detecting means for detecting the temperature of the atmosphere in the apparatus;

clock control means for controlling the operation clock of the element; and control means for comparing a predetermined first set temperature and the temperature detected by the system temperature detecting means with each other, comparing a predetermined second set temperature and the temperature detected by the element temperature detecting means with each other, and controlling the operation clock of the element by the clock control means on the basis of the results of the comparisons.

A further object of the present invention is to provide an information processing apparatus including:

a control substrate on which an element is disposed;

element temperature detecting means for detecting a temperature emitted by the element;

system temperature detecting means for detecting the temperature of the atmosphere in the apparatus;

clock control means for controlling the operation clock of the element;

an electric power supply unit for supplying electric power into the apparatus; and control means for comparing a predetermined first set temperature and the temperature detected by the system temperature detecting means with each other, comparing a predetermined second set temperature and the temperature detected by the element temperature detecting means with each other, and controlling the supply of the electric power from the electric power supply unit into the apparatus on the basis of the results of the comparisons.

BRIEF DESCRIPTION OF THE DRAWINGS

FIG. 10 which is composed of FIGS. 10A and 10B is a flow chart showing an example of a method of driving the radiating fan motor.

DESCRIPTION OF THE PREFERRED EMBODIMENTS

An information processing apparatus as an embodiment of the present invention will hereinafter be described with reference to the drawings.

Figure 1:
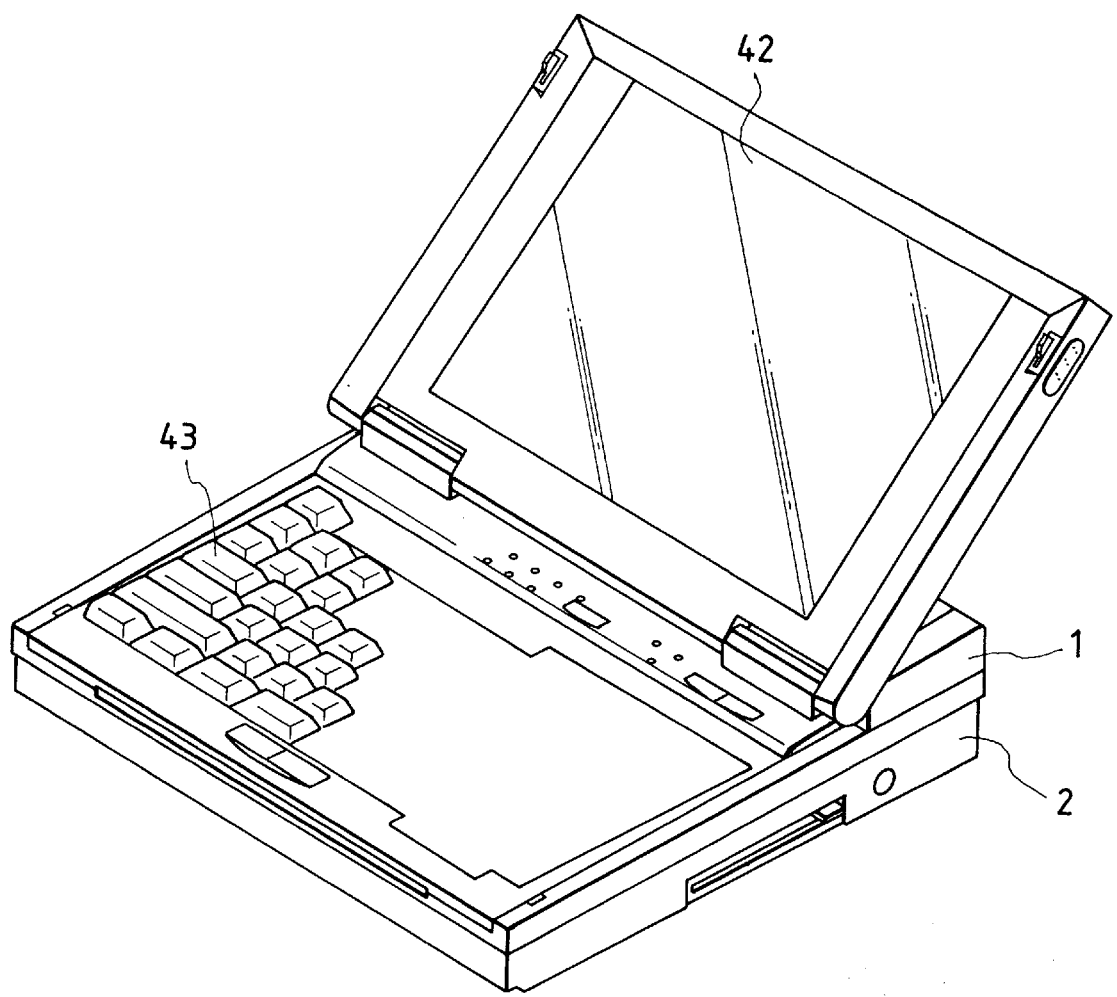
FIG. 1 is a pictorial perspective view of a computer containing therein an ink jet printer to which is applied an information processing apparatus as an embodiment of the present invention.

FIG. 1 is a pictorial perspective view of a computer containing therein an ink jet printer to which is applied the information processing apparatus as an embodiment of the present invention.

The computer shown in FIG. 1 is of a construction including a keyboard 43 as an input device by which information from the outside is inputted, a liquid crystal display 42 as a display device on which is displayed information processed by the information inputted from the keyboard 43, an upper case 1 and a lower case 2.

Figure 2:
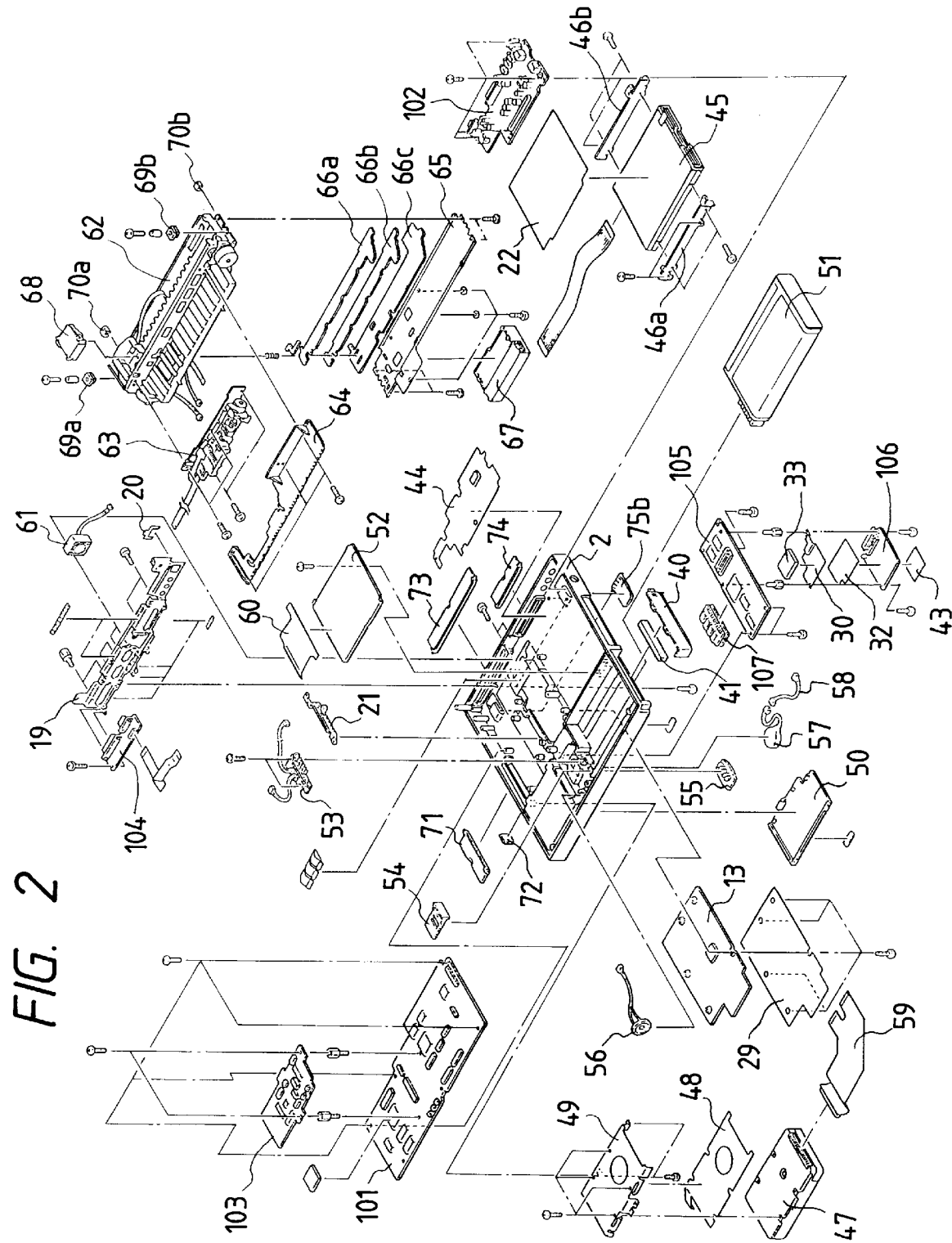
FIG. 2 is an exploded view showing an example of the construction of the parts of a lower case shown in FIG. 1.

FIG. 2 is an exploded view showing an example of the construction of the parts of the lower case 2 shown in FIG. 1.

The reference numeral 101 designates an I/O board on which is mounted an IC card connector (not shown) which is an information card connector and into which an IC card which is an information card is inserted from the body of the computer to thereby control the inputting and outputting of data.

The reference numeral 103 denotes a keyboard board which is connected onto the I/O board 101 by a connector and processes the input from the keyboard 43.

The reference numeral 102 designates a power supply board on which a connector for an AC adapter, an interface connector and a mouse connector are mounted and which is connected to the I/O board 101 to thereby supply a power source.

The reference numeral 104 denotes an interface board which is connected to the I/O board by a flexible cable and on which an interface connector is mounted. The reference numeral 19 designates a connector chassis on which the power supply board 102 and the interface board 104 are mounted.

The reference numeral 61 denotes a radiating fan motor which is mounted on the connector chassis 19 and which is radiating means for sending a blast in an exhaust direction during driving.

The reference numeral 20 designates a fixed metal fitting for attaching the connector for an AC adapter to the connector chassis 19.

The reference numeral 105 denotes a memory board which is attached to the lower case 2 and the fixed metal fitting 21 and is connected to the I/O board 101 and on which are mounted a cash, a chip such as cash control, a DIMM socket (not shown), etc.

The reference numeral 106 designates an MPU board which is a control substrate which is connected to the memory board 105 by a connector and on which is mounted a microprocessor (not shown) which is control means.

The reference numeral 30 denotes an MPU heat sink which is connected to the memory board 105 and the MPU board 106 through silicone rubber 33 and a heat sheet 32 and which radiates the heat of the microprocessor.

The reference numeral 13 designates a back cover formed of a metallic material such as aluminum and connected to the MPU board 106 through silicone rubber 43 to thereby have an effect as a radiating plate.

The reference numeral 29 denotes a heat preventing sheet formed of a sheet material of plastic adhesively secured to the outer surface side of the back cover 13.

The reference numeral 107 designates a memory module for additional provision mounted on the DIMM socket on the memory board 105.

The reference numeral 44 denotes a PS insulating sheet for insulating the plated portion of the bottom surface of the lower case 2 and the power supply board 102 from each other.

The reference numeral 45 designates a floppy disc device as an outside memory device fixed to the lower case 2 by FDD fixing metal fittings 46a and 46b.

The reference numeral 22 denotes an FDD insulating sheet for insulating the I/O board 101 and the metallic chassis portion of the floppy disc device 45 from each other.

The reference numeral 47 designates a hard disc device comprising a magnetic disc and a control device therefor which are mounted on an HDD fixing mount plate 49 with an HDD sheet 48 sandwiched therebetween and are fixed to the lower case 2.

The reference numeral 50 denotes an HDD cover mounted on the lower case 2 and covering the hard disc device 47.

The reference numeral 51 designates a battery inserted between the lower case 2 and a battery guide 52 mounted on the lower case 2, and contained in the computer.

The reference numeral 53 denotes a battery terminal unit fixed to the lower case 2 and electrically connecting the battery 51 to the I/O board 101 and the power supply board 102.

The reference numeral 40 designates a battery cover mounted on the lower case 2 for covering the battery 51.

The reference numeral 41 denotes a battery cushion adhesively secured to the battery cover 40 for preventing the backlash of the battery 51.

The reference numeral 54 designates a battery release guide used when the battery 51 is removed, and the reference numeral 55 denotes a battery release knob.

The reference numeral 56 designates a speaker held by the lower case 2 and the cable of which is connected to the I/O board 101.

The reference numeral 57 denotes a lithium battery as a power source connected to the I/O board 101 by a relay cable 58 for holding the substance of CMOS or the like.

The reference numeral 59 designates an HDD flexible cable for connecting the hard disc device 47 and the I/O board 101 together.

The reference numeral 60 denotes an HDD sheet mounted on the battery guide 52 so that the HDD flexible cable 59 and the cable of the speaker 56 or the like may not contact with each other.

The reference numeral 62 designates an ink jet type printer which is a recording apparatus resiliently held on the lower case 2 through printer fixing rubber 69a, 69b, 70a, 70b.

The reference numeral 63 denotes an auto sheet feeder mounted on the printer 62, and the reference numeral 64 designates a printer paper feed guide.

The reference numeral 68 denotes a head cartridge having an ink jet recording head provided with an ink discharge port, and carried on a carriage and subjected to a discharge recovering process for preventing the clogging of the ink discharge port by a recovery mechanism, not shown, disposed in a non-recording area in the movement area of the carriage at the start of recording or the like.

The reference characters 66a, 66b and 66c designate absorbing members held by an under plate 65 and mounted on the printer 62 for absorbing waste ink discharged during the discharge recovering process.

The reference numeral 67 denotes a sub waste ink tank comprising a plastic case for holding the absorbing members 66a, 66b and 66c.

The reference numeral 71 designates an IC card lid for covering the IC card connector mounted on the I/O board 101.

The reference numerals 73 and 74 denote interface connector lids for covering the interface connectors mounted on the interface board 104 and the power supply board 102.

The reference numeral 72 designates an IP filter adhesively secured to the lower case 2 and mounted on the I/O board 101 for effecting infrared ray communication or the like and covering a light emitting and receiving module (not shown).

The reference character 75b denotes a tilt foot pivotally held on the lower case 2 and used while being caused to stand up when the computer body is inclined and used.

Cards used as the IC card include hard disc cards and modem cards, some of which may cause a bad operation due to heat. Therefore, the structure of the lower case 2 need be made difficult to transmit heat from the microprocessor, as will be described later.

Figure 3:
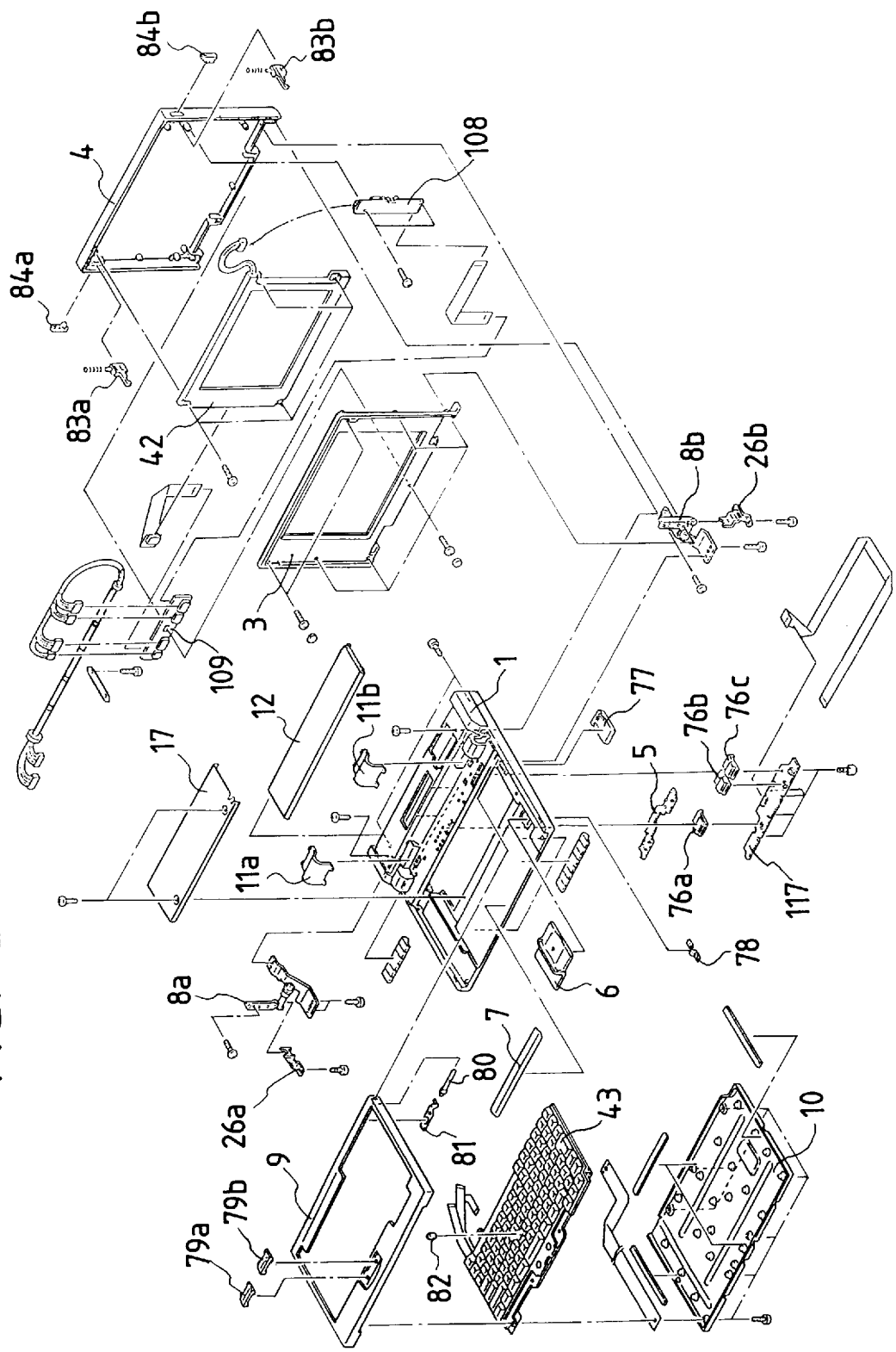
FIG. 3 is an exploded view showing an example of the construction of the parts of an upper case shown in FIG. 1.

FIG. 3 is an exploded view showing an example of the construction of the parts of the upper case 1 shown in FIG. 1.

The reference numeral 4 designates an LCD case on which a liquid crystal display 42 is mounted.

The reference numeral 3 denotes an LCD cover covering the liquid crystal panel side of the liquid crystal display 42.

The reference numeral 108 designates an inverter substrate connected to the liquid crystal display 42 by a cable.

The reference numeral 109 denotes an LCD relay substrate connected to the liquid crystal display 42 and the inverter substrate 108 by flexible cables and connected to the I/O board 101 (see FIG. 2) by a cable.

The reference characters 11a and 11b designate cable covers attached to the upper case 1 for covering the cables.

The reference characters 8a and 8b denote hinges fixed to the upper case 1 and the LCD case 4, respectively, for pivotally holding the LCD case.

The reference characters 26a and 26b designate hinge covers attached to the upper case 1 for covering the hinges 8a and 8b, respectively.

The reference numeral 117 denotes an LED board which is fixed to the upper case 1 with switch buttons 76a, 76b, 76c and an LED lens 5 interposed therebetween and on which are mounted switches for performing the ON/OFF operation of a power source and switching on and off the power source of a display LED for displaying the access state or the like of the floppy disc device 45 and effecting paper feed in the printer 62.

The reference numeral 9 designates a keyboard upper case for covering the keyboard 43.

The reference numeral 82 denotes a cap for a keyboard lower case 10 and the operating lever of a pointing device provided on the keyboard 43.

The reference characters 79a and 79b designate the click buttons of a pointing device provided on the keyboard upper case 9.

The reference numeral 80 denotes a keyboard rotary shaft mounted on the keyboard upper case 9 and slidably held by a biasing spring attached to the keyboard upper case 9 and fitted in the recess of the upper case 1 for openably and closably supporting a keyboard unit relative to the upper case 1 so that paper set relative to the upper case 1 may be easily set.

The reference numeral 77 designates a keyboard click spring attached to the upper case 1 for holding the keyboard unit in its open state.

The reference numeral 17 denotes a paper feed guide mounted between the printer 62 (see FIG. 2) and the lower case 2 for guiding the set paper to the printer 62 (see FIG. 2).

The reference numeral 7 designates a paper feed pad for imparting a frictional force to the paper to thereby prevent the double feeding of the paper.

The reference numeral 6 denotes a paper edge guide slidably held on the upper case 1 by an edge guide keeper 78 for regulating the right end of the paper.

A convex portion is formed in the symmetrical side of the keyboard upper case 9 and fits in the concave portion of the upper case 1. Also, the flexible cable of the keyboard 43 is connected to the keyboard board 103, and the keyboard unit can be easily removed from the upper case 1 by a method which will be described later.

Figure 4:
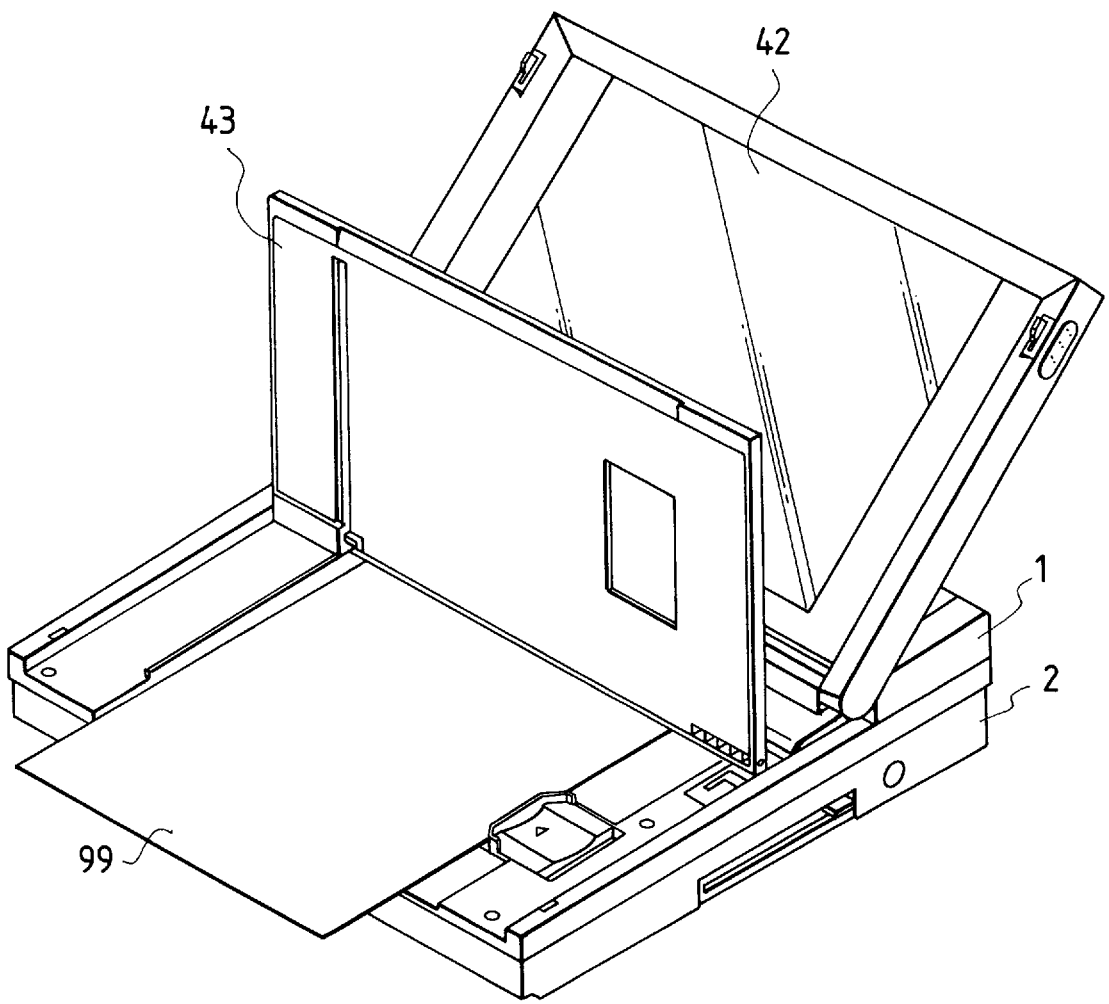
FIG. 4 shows a state in which recording paper is set in the computer shown in FIG. 1.

FIG. 4 shows a state in which paper 99 as a recording medium such as recording paper or a plastic sheet is set in the computer shown in FIG. 1. As shown in FIG. 4, the paper 99 is set between the keyboard 43 and the lower case 2.

Figure 5:
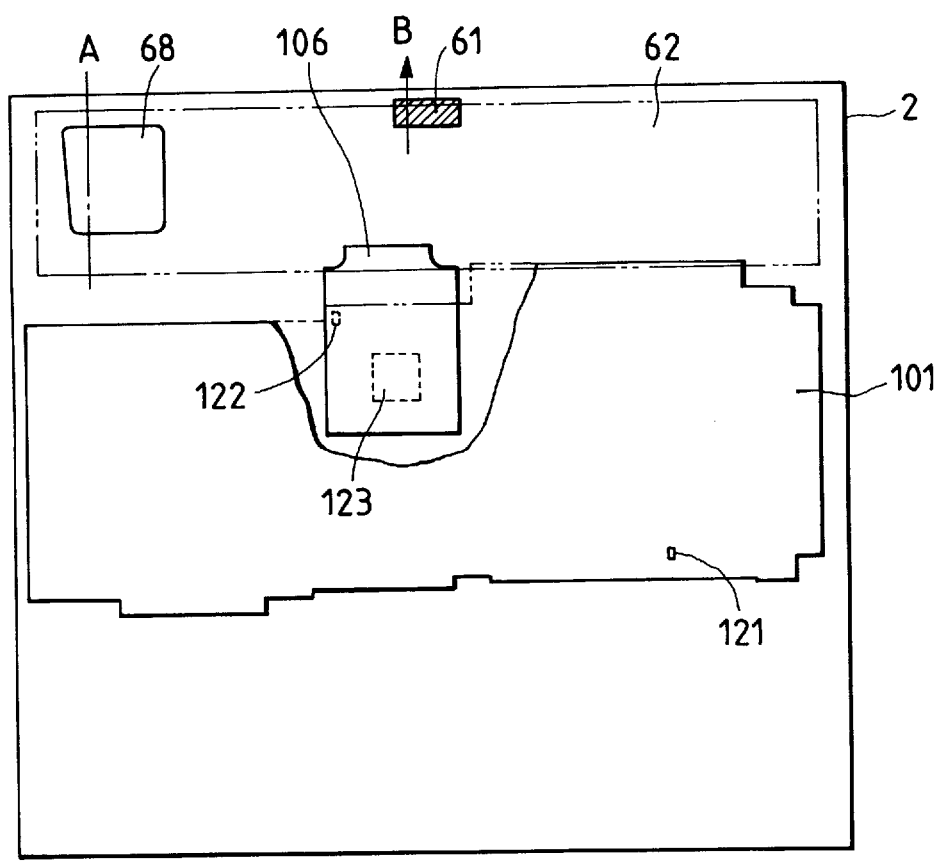
FIG. 5 shows the positional relations among an I/O board, an MPU board, a printer and a radiating fan motor shown in FIG. 2.

FIG. 5 shows the positional relations among the I/O board 101, the MPU board 106, the printer 62 and the radiating fan motor 61 shown in FIG. 2.

The radiating fan motor 61 is disposed on the back side of the lower case 2, and effects exhaustion (the direction of arrow B) from the interior of the computer through the lower of the lower case 2.

The printer 62 is mounted rearwardly of the back side of the lower case 2 so as to overlap the upper portion of the radiating fan motor 61.

Here, a position A is a standby position in which the head cartridge 68 is at a halt during non-recording, and this standby position is a position which does not overlap the radiating fan motor 61.

The reason for this is that when the standby position is a position against which an air stream made by the radiating fan motor 61 directly strikes, the head portion of the head cartridge 68 becomes apt to dry and is liable to cause clogging.

The I/O board 101 is provided on this side of the printer 62, and in an area wherein the I/O board 101 is provided, there is provided a system thermistor 121 which is system temperature detecting means for detecting the temperature of the atmosphere in the apparatus.

The MPU board 106 is provided below the I/O board 101 and has a microprocessor 123 which is most remarkable in heat generation among the electrical and electronic parts of the computer, and an MPU thermistor 122 which is MPU temperature detecting means for detecting the temperature of the microprocessor 123. In the present embodiment, the MPU thermistor 122 is not one which directly contacts with the microprocessor 123 and detects the temperature thereof, but is designed to detect the temperature of a position on the board slightly spaced apart therefrom to thereby indirectly detect the temperature of the microprocessor 123. Of course, the MPU thermistor 122 may be designed to contact with the microprocessor 123 and directly detect the temperature thereof.

Figure 6:
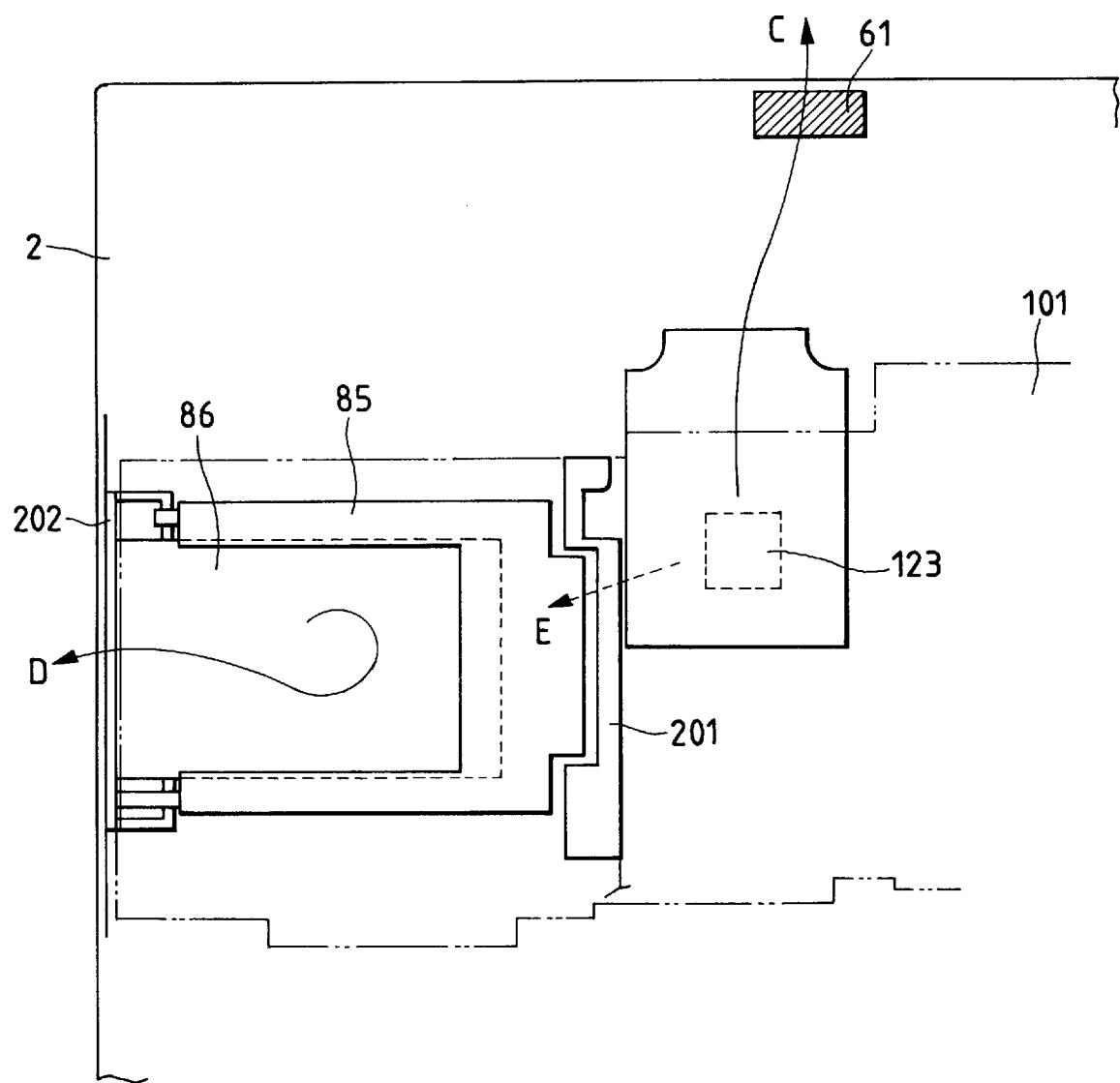
FIG. 6 shows an example in which the structure of the lower case is made difficult to transmit heat from a microcomputer.

FIG. 6 shows an example in which the structure of the lower case 2 is made difficult to transmit the heat from the microprocessor, and is a view of a member disposed on the back side of the I/O board 101 as it is seen from its front side.

As shown in FIG. 6, a wall surface portion 201 is provided between the microprocessor 123 of the lower case 2 and the IC card connector 85, whereby the heat from the microprocessor 123 is difficult to be transmitted in the direction of arrow E and is radiated chiefly in the direction of arrow C during the non-driving of the radiating fan motor 61 as well, and the increase in the amount of radiation of the heat becomes more remarkable during the driving of the radiating fan motor 61.

Also, when the IC card 86 itself generates heat, the heat is radiated in the direction of arrow D by natural convection or the like, from an opening 202 in the lower case 2 on which the IC card lid 71 (see FIG. 2) is mounted.

Figure 7:
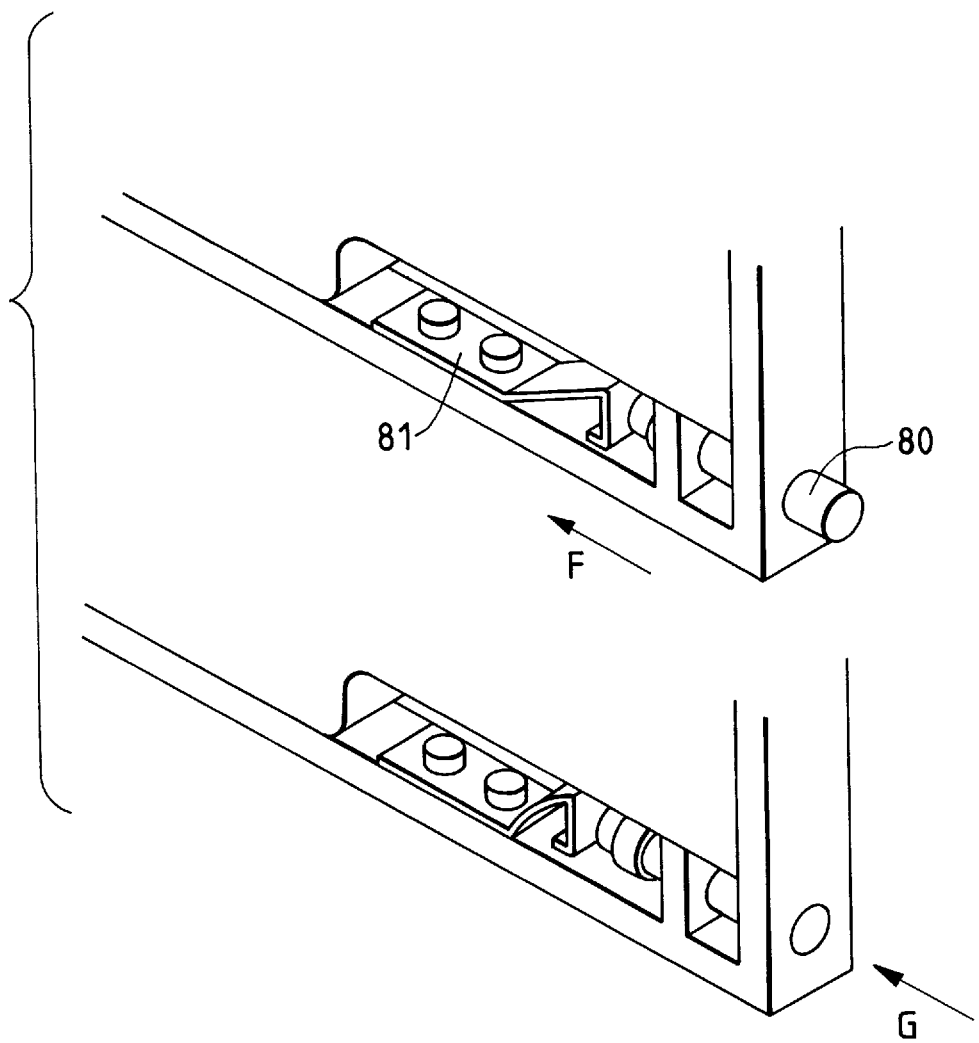
FIG. 7 is a view for illustrating the removal of a keyboard unit.
Figure 8:
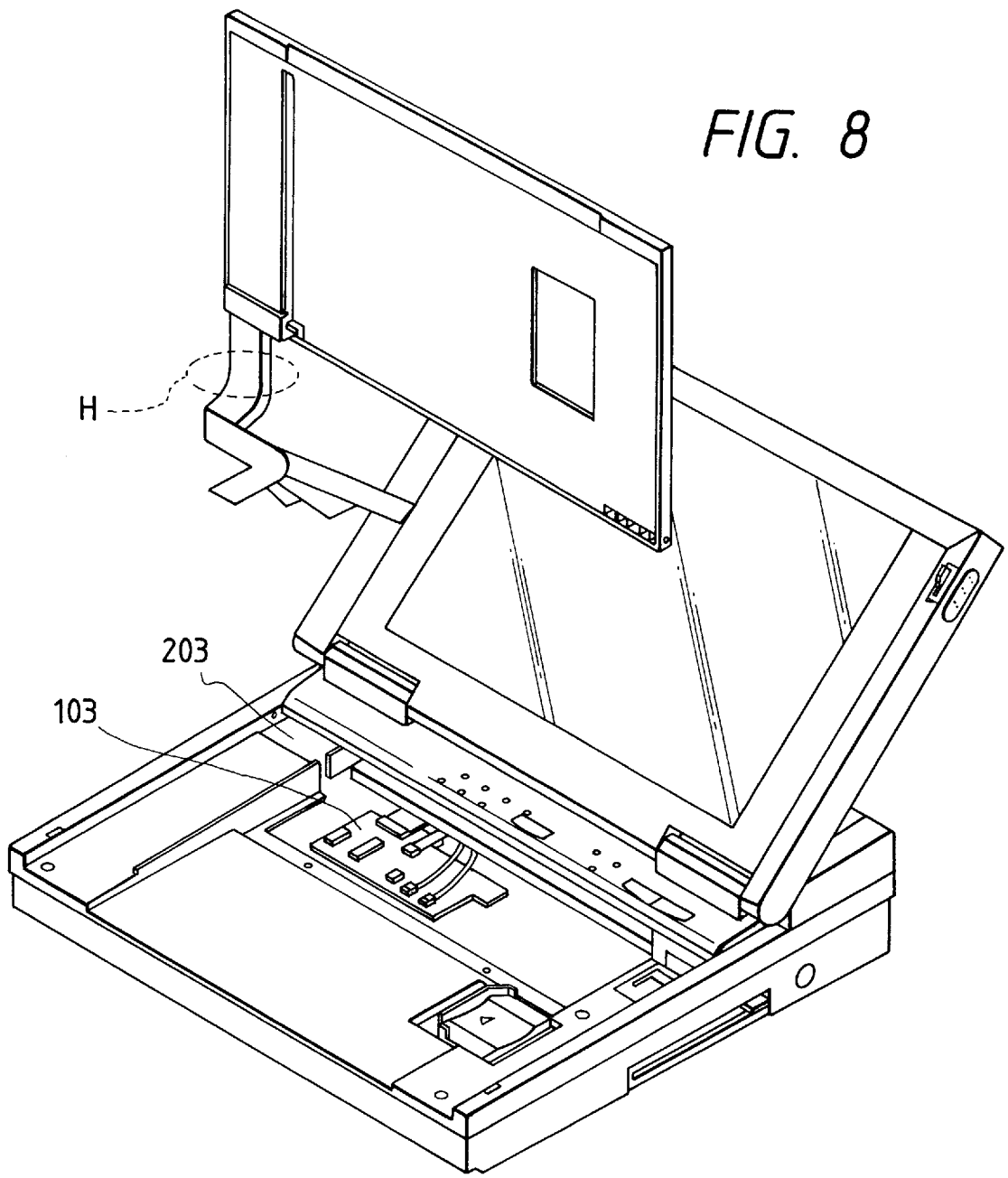
FIG. 8 is a view for illustrating the removal of the keyboard unit.

FIGS. 7 and 8 are views for illustrating the removal of the keyboard unit.

First, as shown in FIG. 7, the paper feed guide 17 (see FIG. 3) is removed from the body, whereafter the keyboard rotary shaft 80 is slidden in the direction of arrow F which is a direction opposite to the biasing direction of the biasing spring 81. Thereupon, the convex portion of the keyboard rotary shaft 80 which has jumped out of the keyboard upper case 9 (see FIG. 3) is retracted in the direction of arrow G and thus, the shaft 80 becomes removable from the lower case 2. Thereafter, as shown in FIG. 8, the flexible cable of the keyboard 43 (see FIG. 3) is removed from the keyboard board 103, and the substantially H-shaped portion of the flexible cable of the keyboard 43 is passed through an opening 203 in the lower case 2, whereby it is possible to easily remove the keyboard unit from the body.

The printer 62 is provided with a conveying mechanism for conveying a recording medium such as recording paper or a plastic sheet in the sub scanning direction, a carriage carrying the head cartridge 68 as a recording head, etc. thereon and movable in the sub scanning direction and a driving mechanism therefor, but may be of a construction in which a reading head for reading image information formed on an original conveyed by the conveying mechanism is carried on said carriage.

Further, it may be of a construction in which a recording head is carried on the carriage and discretely from it, a reading head is carried on the apparatus.

Also, the recording head or the reading head may be a so-called line type head.

Also, the recording head may be of the thermosensitive type, the heat transfer type, the sublimation type or like type, but the recording system best suited for a printer which is compact and can print highly accurate full color images at high speed is the ink jet system. An ink jet recording head is mounted on a carriage 2 so that a discharge port forming surface in which a plurality of ink discharge ports for discharging ink are disposed may face a recording medium (such as recording paper) with a predetermined gap (e.g. about 0.5 mm–2.0 mm) therebetween, and an electro-thermal conversion member (such as a heat generating resistance member) for generating energy for discharging ink is disposed along the wall surface of an ink liquid path in each discharge port. Thus, there is constructed recording means in which the corresponding electro-thermal conversion member is driven (electrically energized) on the basis of an image signal or a discharge signal to thereby film-boil the ink in the ink liquid paths and the ink is discharged from the ink discharge ports by pressure created at that time.

In an ink jet printing apparatus using such recording means, the ink discharge ports of the ink jet recording head are minute ports and therefore, even when the entry of air bubbles or dust into the discharge ports has occurred or when the ink has become unsuitable for discharge or recording due to an increase in viscosity resulting from the evaporation of the ink solvent, the ink is discharged during non-recording or the ink is sucked from the ink discharge ports by the utilization of negative pressure, whereby a discharge recovery process for eliminating any factor for bad discharge is carried out. In the present embodiment, the carriage is moved to the outside of a recording area during non-recording and a cap, not shown, provided there is brought into opposed relationship with the ink discharge ports of the ink jet recording head. The ink is then discharged from the ink discharge ports into the cap to thereby carry out the recovery process, whereafter the ink discharged into the cap is discharged out of the cap by the use of a suction pump, not shown.

Other energy generating means for generating such energy include a recording method using an electro-mechanical conversion member such as a piezo element, and a recording method using energy generating means for applying an electromagnetic wave such as a laser to thereby generate heat and discharging liquid droplets by the action of the heat.

However, of these ink discharge energy generating methods, the recording head used in the ink jet recording method of discharging liquid droplets by heat energy enables liquid discharge ports for discharging liquid for recording to thereby form a liquid droplet to be discharged to be arranged highly densely and therefore, can accomplish recording at high resolution. Above all, a recording head using an electro-thermal conversion member as an energy generating source is easy to make compact and is advantageous in that it can fully make the most of the merits of the IC technique and micro-working technique which are remarkable in the advance of the latest technology in the field of semiconductor and in the improvement in reliability, and is easy to mount highly densely and inexpensive to manufacture.

The form of such as ink jet recording head may be a form in which an ink jet head portion and an ink storing portion (ink tank) storing therein the ink to be discharged are formed in a unitary housing and the two may be mounted or dismounted with respect to a carriage at a time, or a form in which the ink jet head portion and the ink storing portion are separable from each other and the two are used in connection to each other so that ink can be supplied from the ink storing portion to the ink jet head portion.

Description will hereinafter be made of a method of managing and controlling the temperature of the atmosphere in the information processing apparatus of the present embodiment.

The set temperatures of MPU temperature T1 and system temperature T2 in the control flows (FIGS. 10A, 10B, 11A, 11B and 12) of the following respective embodiments are exemplarily shown as being optimum values at the installation positions of the system thermistor 121 and MPU thermistor 122 in the above-described apparatus construction (FIGS. 1, 2, 3, 4, 5, 6, 7, 8 and 9). Accordingly, when the system thermistor 121 and MPU thermistor 122 are installed in an apparatus of a construction differing from the present embodiment or at different positions, the specific set temperature values in the control flows shown below (FIGS. 10A, 10B, 11A, 11B and 12) becomes different values as a matter of course.

Figure 9:
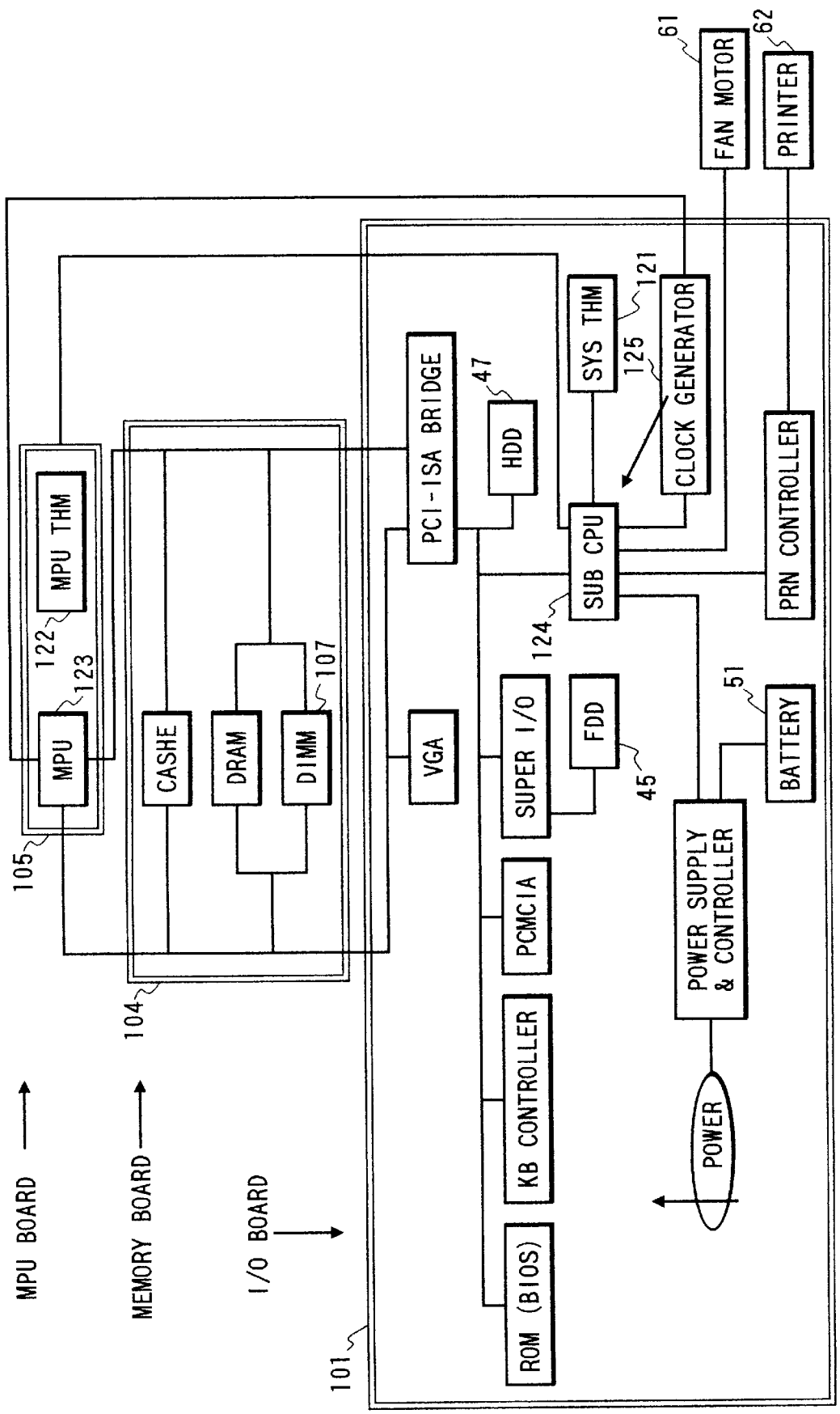
FIG. 9 schematically shows the construction of an example of the control block of an information processing apparatus as an embodiment of the present invention.

FIG. 9 is a schematic construction diagram showing the control blocks of an information processing apparatus according to a first embodiment of the present invention.

As shown in FIG. 9, the control flows (FIGS. 10A, 10B, 11A, 11B and 12) in the respective embodiments are controlled by a sub CPU 124 as temperature managing control means in which a ROM and a RAM are contained and which stores the data of each temperature set value or the like therein and compares the temperatures detected by the system thermistor 121 and MPU thermistor 122 with the data of each temperature set value or the like and gives a control command based on the result of the comparison to the radiating fan motor 61. The sub CPU 124 also outputs a control command to a clock generator 125 which is clock control means for effecting the control of the operation clock of the microprocessor 123, on the basis of the result of the above-described comparison.

FIGS. 10A and 10B are flow charts showing an example of a method of driving the radiating fan motor.

First, MPU temperature T1 is read in by the MPU thermistor 122 (see FIG. 9) provided on the MPU board 106 (see FIG. 9) (step S1), whereafter system temperature T2 is read in by the system thermistor 121 (see FIG. 9) provided on the I/O board 101 (see FIG. 9) (step S2). These steps S1 and S2 may be reversed in order.

Next, whether the printer 62 is operating is judged (step S3). This judgment is done to correct the reading error of the system thermistor 121 attributable to the rise of the temperature in the apparatus when the printer 62 is operating.

If at the step S3, it is judged that the printer 62 is not operating, a first set temperature is defined as 46° C. and a second set temperature is defined as 74° C., and whether "system temperature T2>46° C. or MPU temperature T1>74° C." is judged (step S4). If at the step S4, it is judged that "MPU temperature T1>74° C. or system temperature T2>46° C.", the radiating fan motor 61 (see FIG. 9) is driven (step S5).

If at the step S4, it is judged that not "MPU temperature T1>74° C. or system temperature T2>46° C.", or after at the step S5, the radiating fan motor is driven, a third set temperature is defined as 44° C., and a fourth set temperature is defined 72° C., and whether "system temperature T2≦44° C. and MPU temperature T1≦72° C." is judged (step S6).

If at the step S6, it is judged that "MPU temperature T1≦72° C. and system temperature T2≦44° C.", the radiating fan motor 61 is stopped (step S7).

If on the other hand, at the step S3, it is judged that the printer 62 is operating, the first set temperature is defined as 42° C. and the second set temperature is defined as 74° C., and whether "system temperature T2>42° C. or MPU temperature T1>74° C." is judged (step S8).

If at the step S8, it is judged that "MPU temperature T1>74° C. or system temperature T2>42° C.", the radiating fan motor 61 (see FIG. 9) is driven (step S9).

If at the step S8, it is judged that not "MPU temperature T1>74° C. or system temperature T2>42° C.", or after the radiating fan motor is driven, the third set temperature is defined as 40° C. and the fourth set temperature is defined as 72° C., and whether "system temperature T2≦40° C. and MPU temperature T1≦72° C." is judged (step S10).

If at the step S10, it is judged that "MPU temperature T1≦72° C. and system temperature T2≦40° C.", the radiating fan motor 61 is stopped (step S11).

(1) if at the step S6, it is judged that not "MPU temperature T1≦72° C. and system temperature T2≦44° C.", or (2) if at the step S10, it is judged that not "MPU temperature T1≦72° C. and system temperature T2≦40° C.", or (3) after the radiating fan motor 61 is stopped, a seventh set temperature is defined as 90° C., and whether "MPU temperature T1>90° C." is judged (step S12).

If at the step S12, it is judged that "MPU temperature T1>90° C.", it is judged that the computer is in an abnormal state, and the power source of the computer is forcibly cut off (step S13).

If at the step S12, it is judged that not "MPU temperature T1>90° C.", whether temperature alert is released is judged (step S14).

If at the step S14, it is judged that temperature alert is released, a fifth set temperature is defined as 76° C., and whether "MPU temperature T1>76° C." is judged (step S15).

If at the step S15, it is judged that "MPU temperature T1>76° C.", the operation clock of the microprocessor 123 (see FIG. 9) is downed from 60 MHz to 33 MHz by the clock generator 125 (see FIG. 9) (step S16), and the alert flag is set (step S17).

If on the other hand, at the step S14, it is judged that temperature alert is not released, a sixth set temperature is defined as 71° C., and whether "MPU temperature T1≦71° C." is judged (step S18).

If at the step S18, it is judged that "MPU temperature T1≦71° C.", the down of the operation clock of the microprocessor 123 is released by the clock generator 125 (see FIG. 9) (step S19), and the alert release flag is set (step S20).

(1) If at the step S15, it is judged that not "MPU temperature T1>76° C.", or (2) if at the step S18, it is judged that not "MPU temperature T1≦71° C.", or (3) after the termination of the processing at the step S17, or (4) after the termination of the processing at the step S20, the computer stands by for 10 ms (step S21). In the meantime, other control necessary as the computer is effected, and 10 ms after, the above-described series of control operations are performed again.

Also, the control in the present embodiment is effected under the exclusive sub CPU 124 as described above and therefore, even if the power source of the computer body is in its off state, if the supply of electric power is down from a battery or the like contained in this sub CPU 124, the driving of the radiating fan motor 61 based on the present embodiment can be controlled. Accordingly, the heat generation of this battery or the like when a body driving secondary battery mounted in the computer is being charged with the power source of the computer kept OFF can also be coped with.

The control block of an information processing apparatus according to a second embodiment of the present invention will now be described with reference to FIGS. 11A and 11B. The construction of the information processing apparatus according to the present embodiment is similar to the construction shown in FIGS. 1, 2, 3, 4, 5, 6, 7, 8 and 9, and described above, and the present embodiment differs from the first embodiment in the drive control of the radiating fan motor, the operation clock control and the method of cutting off the power source of the apparatus.

Figure 11B:
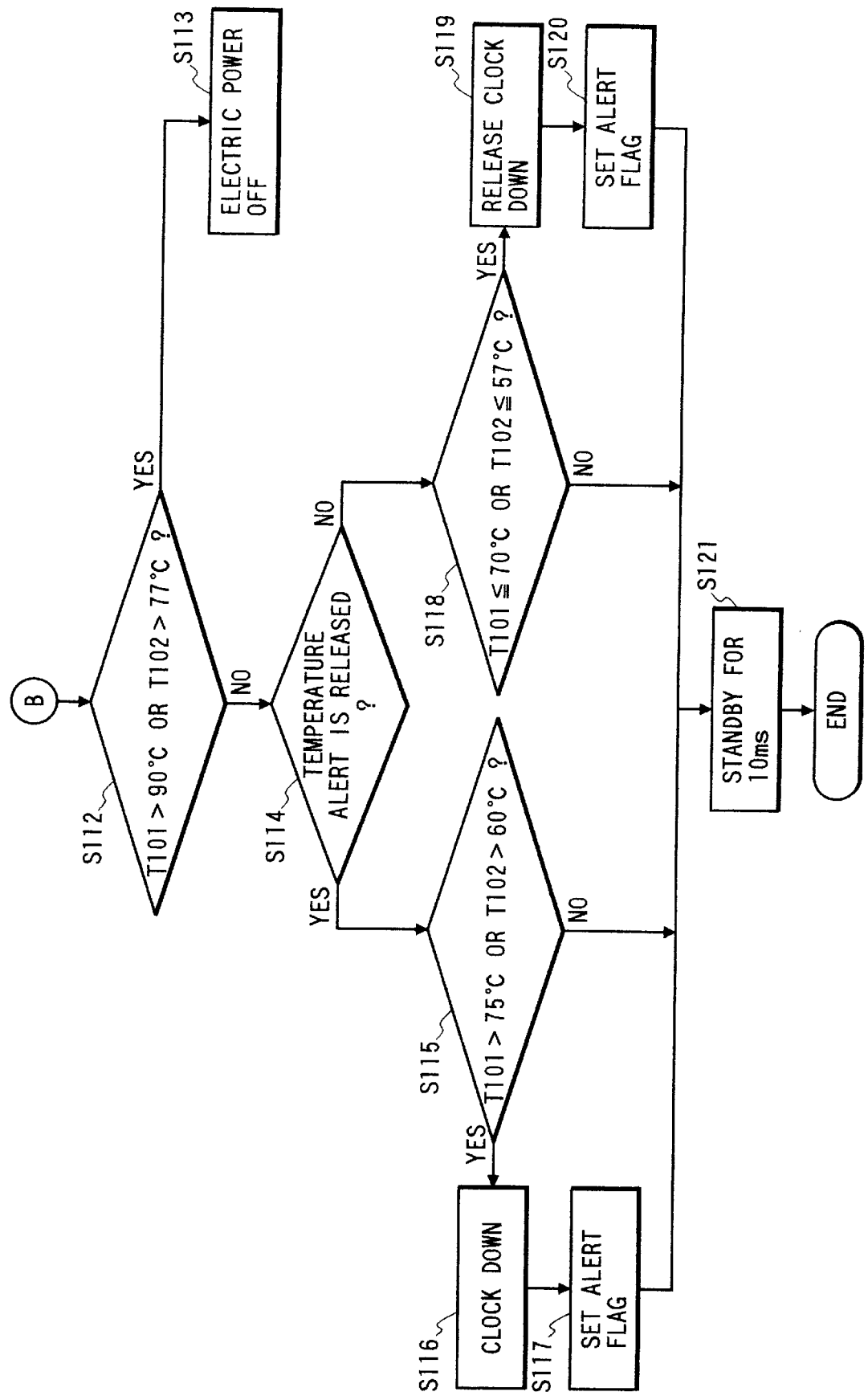
FIG. 11 which is composed of FIGS. 11A and 11B is a flow chart showing another example of the method of driving the radiating fan motor.

FIGS. 11A and 11B are flow charts showing an example of the method of driving the radiating fan motor. First, MPU temperature T101 is read in by the MPU thermistor 122 (see FIG. 9) provided on the MPU board 106 (see FIG. 9) (step S101), whereafter system temperature T102 is read in by the system thermistor 121 (see FIG. 9) provided on the I/O board 101 (see FIG. 9) (step S102). These steps S101 and S102 may be reversed in order.

Next, whether the printer 62 (see FIG. 9) is operating is judged (step S103). This judgment is done to correct any reading error of the system thermistor 121 attributable to the rise of the internal temperature which may occur if the printer 62 is operating.

If at the step S103, it is judged that the printer 62 is not operating, the first set temperature is defined as 55° C. and the second set temperature is defined as 70° C., and whether "system temperature T102>55° C. or MPU temperature T101>70° C." is judged (step S104).

If at the step S104, it is judged that "MPU temperature T101>70° C. or system temperature T102>55° C.", the radiating fan motor 61 (see FIG. 9) is driven (step S105).

If at the step S104, it is judged that not "MPU temperature T101>70° C. or system temperature T102>55° C." or after the radiating fan motor is driven at the step S105, the third set temperature is defined as 50° C. and the fourth set temperature is defined as 67° C., and whether "system temperature T102≦50° C. and MPU temperature T101≦67° C." is judged (step S106).

If at the step S106, it is judged that "MPU temperature T101≦67° C. and system temperature T102≦50° C.", the radiating fan motor 61 is stopped (step S107).

If on the other hand, at the step S103, it is judged that the printer 62 is operating, the first set temperature is defined as 42° C. and the second set temperature is defined as 70° C., and whether "system temperature T102>42° C. or MPU temperature T101>70° C." is judged (step S108).

If at the step S108, it is judged that "MPU temperature T101>70° C. or system temperature T102>42° C.", the radiating fan motor 61 (see FIG. 9) is driven (step S109).

If at the step S108, it is judged that not "MPU temperature T101>70° C. or system temperature T102>42° C.", or after the radiating fan motor is driven at the step S109, the third set temperature is defined as 40° C. and the fourth set temperature is defined as 67° C., and whether "system temperature T102≦40° C. and MPU temperature T101≦67° C." is judged (step S110).

If at the step S110, it is judged that "MPU temperature T101≦67° C. and system temperature T102≦40° C.", the radiating fan motor 61 is stopped (step S111).

(1) If at the step S106, it is judged that not "MPU temperature T101≦67° C. and system temperature T102≦50° C.", or (2) if at the step S110, it is judged that not "MPU temperature T101≦67° C. and system temperature T102≦40° C.", or (3) after the radiating fan motor 61 is stopped, a twelfth set temperature is defined as 77° C. and a thirteenth set temperature is defined as 90° C., and whether "system temperature T102>77° C. or MPU temperature T101>90° C." is judged (step S112).

If at the step S112, it is judged that "MPU temperature T101>90° C. or system temperature T102>77° C.", it is judged that the computer is in an abnormal state, and the power source of the computer is forcibly cut off (step S113).

If at the step S112, it is judged that not "MPU temperature T101>90° C. or system temperature T102>77° C.", whether temperature alert is released is judged (step S114).

If at the step S114, it is judged that temperature alert is released, an eighth set temperature is defined as 60° C. and a ninth set temperature is defined as 75° C., and whether "system temperature T102>60° C. or MPU temperature T101>75° C." is judged (step S115).

If at the step S115, it is judged that "MPU temperature T101>75° C. or system temperature T102>60° C.", the operation clock of the microprocessor 123 (see FIG. 9) is downed from 60 MHz to 33 MHz by the clock generator 125 (see FIG. 9) (step S116), and the alert flag is set (step S117).

If on the other hand, at the step S114, it is judged that temperature alert not is released, a tenth set temperature is defined 57° C. and an eleventh set temperature is defined as 70° C., and whether "system temperature T102≦57° C. and MPU temperature T101≦70° C." is judged (step S118).

If at the step S118, it is judged that "MPU temperature T101≦70° C. and system temperature T102≦57° C.", the down of the operation clock of the microprocessor 123 is released by the clock generator 125 (see FIG. 9) (step S119), and the alert release flag is set (step S120).

(1) If at the step S115, it is judged that not "MPU temperature T101>75° C. or system temperature T102>60° C.", or (2) if at the step S118, it is judged that not "MPU temperature T101≦70° C. and system temperature T102≦57° C.", or (3) after the termination of the processing at the step S117, or (4) after the termination of the processing at the step S120, the computer stands by for 10 ms (step S121). In the meantime, other control necessary as the computer is effected, and 10 ms after, the above-described series of control operations are performed again.

Also, the control in the present embodiment is effected under the exclusive sub CPU 124 as described above and therefore, even if the power source of the computer body is in its off state, if the supply of electric power is done from an exclusive battery contained in this sub CPU 124 or a body driving secondary battery or the like, the driving of the radiating fan motor 61 based on the present embodiment can be controlled. Accordingly, the heat generation of the battery when the body driving secondary battery mounted in the computer is being charged with the power source of the computer kept in its off state can also be coped with.

The control block of an information processing apparatus according to a third embodiment of the present invention will hereinafter be described with reference to FIG. 12. The construction of the information processing apparatus according to the present embodiment is similar to the construction shown in FIGS. 1, 2, 3, 4, 5, 6, 7, 8 and 9, and described above, and the present embodiment differs from the first embodiment in the drive control of the radiating fan motor, the control of the operation clock and the method of cutting off the power source of the apparatus. The present embodiment is one in which the management and control of the temperature of the atmosphere such as the temperature in the apparatus using the radiating fan are not effected and therefore, the radiating fan and the construction for driving it may be eliminated.

Figure 12:
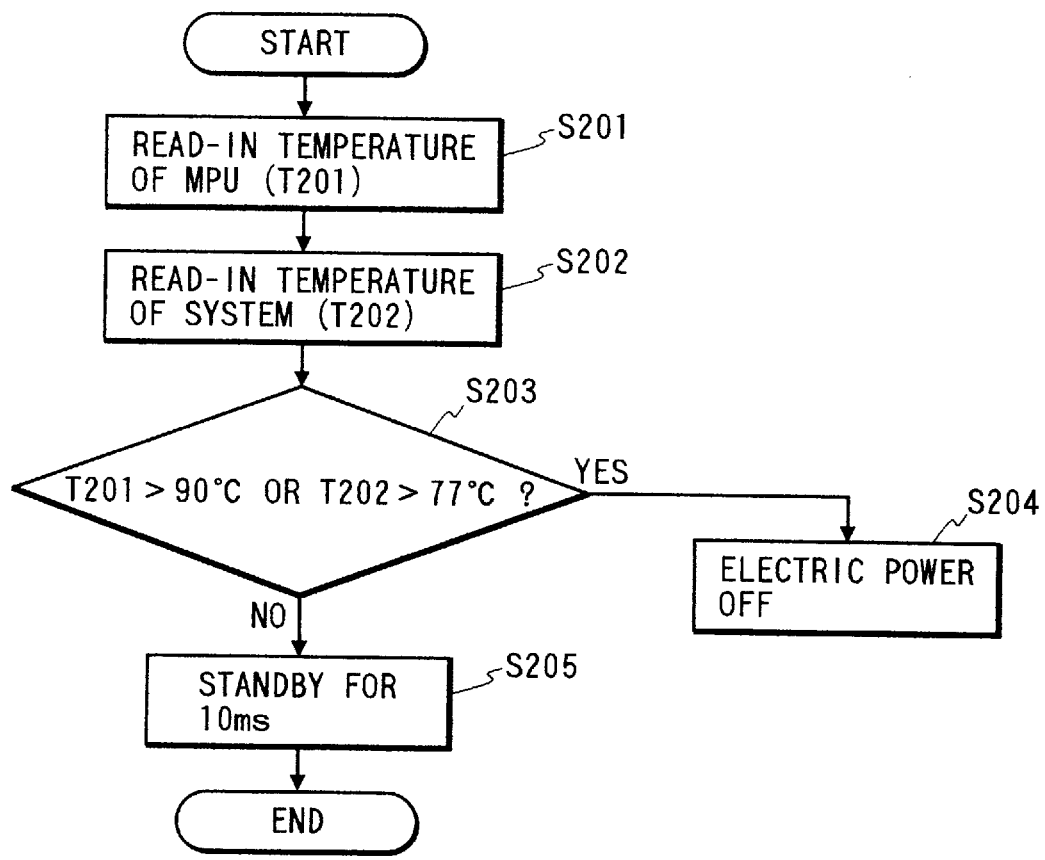
FIG. 12 is a flow chart showing an example of the method of controlling and driving the system temperature and the MPU temperature.

FIG. 12 is a flow chart showing an example of the method of controlling the temperature in the apparatus and MPU temperature. First, MPU temperature T201 is read in by the MPU thermistor 122 (see FIG. 9) provided on the MPU board 106 (see FIG. 9) (step S201), whereafter system temperature T202 is read in by the system thermistor 121 (see FIG. 9) provided on the I/O board 101 (see FIG. 9) (step S202). These steps S201 and S202 may be reversed in order.

Next, whether "system temperature T202>77° C. or MPU temperature T201>90° C." is judged (step S203).

If at the step S203, it is judged that "MPU temperature T201>90° C. or system temperature T202>77° C.", it is judged that the computer is in an abnormal state, and the power source of the computer is forcibly cut off (step S204).

If at the step S203, it is judged that not "MPU temperature T201>90° C. or system temperature T202>77° C.", the computer stands by for 10 ms (step S205). In the meantime, other control necessary as the computer is effected, and 10 ms after, the above-described series of control operations are performed again.

Also, the control in the present embodiment is effected under the exclusive sub CPU 124 as described above and therefore, even if the power source of the computer body is in its off state, if the supply of electric power is done from an exclusive battery contained this sub CPU 124 or a body driving secondary battery or the like, the driving of the radiating fan motor 61 based on the present embodiment can be controlled. Accordingly, the heat generation of the battery when the body driving secondary battery mounted in the computer is being charged with the power source of the computer kept in its off state can also be coped with.

As described above, in the above-described embodiments, provision is made of system temperature detecting means for detecting the temperature of the atmosphere in the apparatus and substrate element temperature detecting means for detecting the temperature on the control substrate, and a set temperature for controlling the driving of the radiating means is preset in the control means, and the preset set temperature and the temperature detected by the system temperature detecting means and the temperature detected by the substrate element temperature detecting means are compared with one another, and the driving of the radiating means may be controlled on the basis of the result of the comparison and therefore, by the detected temperatures, the radiating means is efficiently driven or the power source of the apparatus itself is cut off.

Thereby, the bad operation of the electrical and electronic parts on the control substrate due to the heat generation of the electrical and electronic parts themselves can be prevented and the control of the temperature in the apparatuses becomes possible, and for example, even when the apparatus has no radiating means or uses a radiating fan as radiating means, the frequency of occurrence of the driving sound of the radiating fan motor can be minimized and further, in a portable computer, the reduction in the like of the battery caused by the power consumption of the radiating fan motor can also be minimized.

Also, in an information processing apparatus containing therein an ink jet printer which is a recording apparatus, the control of the temperature of the atmosphere therein is possible, and this is advantageous for the preservation of the ink and the ink jet head, and the prevention of bad recording becomes possible.

What is claimed is:

1. An information processing apparatus including:

a control substrate on which an element is disposed;

element temperature detecting means for detecting a temperature emitted by said element;

radiating means for reducing the temperature of the atmosphere in the information processing apparatus;

system temperature detecting means for detecting the temperature of the atmosphere in said apparatus; and control means for comparing a predetermined first set temperature and a third set temperature lower than said first set temperature and the temperature detected by said system temperature detecting means with one another, comparing a predetermined second set temperature and a fourth set temperature lower than said second set temperature and the temperature detected by said element temperature detecting means with one another, and controlling the driving of said radiating means on the basis of the results of said comparisons.

2. An information processing apparatus according to claim 1, wherein said control means drives said radiating means when the temperature detected by said system temperature detecting means is higher than said first set temperature or when the temperature detected by said element temperature detecting means is higher than said second set temperature.

3. An information processing apparatus according to claim 1, wherein said control means stops the driving of said radiating means when the temperature detected by said system temperature detecting means is lower than said third set temperature and the temperature detected by said element temperature detecting means is lower than said fourth set temperature.

4. An information processing apparatus according to claim 1, wherein said control means drives said radiating means when the temperature detected by said system temperature detecting means is higher than said first set temperature or when the temperature detected by said element temperature detecting means is higher than said second set temperature, and stops the driving of said radiating means when the temperature detected by said system temperature detecting means is lower than said third set temperature and the temperature detected by said element temperature detecting means is lower than said fourth set temperature.

5. An information processing apparatus according to claim 4, further including clock control means for controlling the operation clock of a microprocessor as said element and wherein said clock control means lowers the operation clock of said microprocessor when the temperature detected by said element temperature detecting means is high as compared with a preset fifth set temperature.

6. An information processing apparatus according to claim 5, wherein when the temperature detected by said element temperature detecting means is low as compared with a sixth set temperature preset to a level lower than said fifth set temperature, said clock control means returns said once lowered operation clock of said microprocessor to the state before it is lowered.

7. An information processing apparatus according to claim 4, wherein said control means cuts off the power source of said apparatus when the temperature detected by said element temperature detecting means is high as compared with a seventh set temperature preset to a level higher than said second set temperature.

8. An information processing apparatus according to claim 4, further including clock control means for controlling the operation clock of a microprocessor as said element, and wherein said clock control means lowers the operation clock of said microprocessor when the temperature detected by said system temperature detecting means is higher than a preset eighth set temperature or when the temperature detected by said element temperature detecting means is higher than a preset ninth set temperature.

9. An information processing apparatus according to claim 8, wherein when the temperature detected by said system temperature detecting means is low as compared with a tenth set temperature preset to a level lower than said eighth set temperature and when the temperature detected by said element temperature detecting means is low as compared with an eleventh set temperature preset to a level lower than said ninth set temperature, said clock control means returns the once lowered operation clock of said microprocessor before it is lowered.

10. An information processing apparatus according to claim 1, which can carry thereon a reading head for reading the image information of an original.

11. An information processing apparatus according to claim 1, which can carry thereon a recording head for effecting image recording on a recording medium.

12. An information processing apparatus according to claim 11, wherein said recording head is an ink jet recording head which discharges ink from an ink discharge port.

13. An information processing apparatus according to claim 12, wherein said ink jet recording head is provided with an electro-thermal conversion member, and discharges the ink by the use of heat energy emitted by said electro-thermal conversion member.

14. An information processing apparatus including:
a control substrate on which an element is disposed;
element temperature detecting means for detecting a temperature emitted by said element;
radiating means for reducing the temperature of the atmosphere in the information processing apparatus;
system temperature detecting means for detecting the temperature of the atmosphere in said apparatus;
clock control means for controlling the operation clock of said element; and
control means for comparing a predetermined first set temperature and the temperature detected by said system temperature detecting means with each other, comparing a predetermined second set temperature and the temperature detected by said element temperature detecting means with each other, and controlling the operation clock of said element by said clock control means on the basis of the results of said comparisons.

15. An information processing apparats according to claim 14, wherein said clock control means lowers the operation clock of said element when the temperature detected by said system temperature detecting means is higher than said first set temperature or when the temperature detected by said element temperature detecting means is higher than said second set temperature.

16. An information processing apparatus according to claim 15, wherein when the temperature detected by said system temperature detecting means is low as compared with a third set temperature preset to a level lower than said first set temperature and when the temperature detected by said element temperature detecting means is low as compared with a fourth set temperature preset to a level lower than said second set temperature, said clock control means returns the once lowered operation clock of said element to the state before it is lowered.

17. An information processing apparatus according to claim 14, wherein said control means cuts off the power source of said apparatus when the temperature detected by said system temperature detecting means is high as compared with a fifth set temperature preset to a level higher than said first set temperature or when the temperature detected by said element temperature detecting means is high as compared with a sixth set temperature preset to a level higher than said second set temperature.

18. An information processing apparatus according to claim 14, which can carry thereon a reading head for reading the image information of an original.

19. An information processing apparatus according to claim 14, which can carry thereon a recording head for effecting image recording on a recording medium.

20. An information processing apparatus according to claim 19, wherein said recording head is an ink jet recording head which discharges ink from an ink discharge port.

21. An information processing apparatus according to claim 20, wherein said ink jet recording head is provided with an electro-thermal conversion member, and discharges the ink by the use of heat energy emitted by said electro-thermal conversion member.

22. An information processing apparatus including:
a control substrate on which an element is disposed;
element temperature detecting means for detecting a temperature emitted by said element;
system temperature detecting means for detecting the temperature of the atmosphere in said apparatus;
clock control means for controlling the operation clock of said element;
an electric power supply unit for supplying electric power into said apparatus; and
control means for comparing a predetermined first set temperature and the temperature detected by said system temperature detecting means with each other, comparing a predetermined second set temperature and the temperature detected by said element temperature detecting means with each other, and controlling the supply of the electric power from said electric power supply unit into said apparatus on the basis of the results of said comparisons.

23. An information processing apparatus according to claim 22, wherein said control means cuts off the supply of the electric power from said electric power supply unit into said apparatus when the temperature detected by said system temperature detecting means is higher than said first set temperature or when the temperature detected by said element temperature detecting means is higher than said second set temperature.

24. An information processing apparatus according to claim 22, which can carry thereon a reading head for reading the image information of an original.

25. An information processing apparatus according to claim 22, which can carry thereon a recording head for effecting image recording on a recording medium.

26. An information processing apparatus according to claim 25, wherein said recording head is an ink jet recording head which discharges ink from an ink discharge port.

27. An information processing apparatus according to claim 26, wherein said ink jet recording head is provided with an electro-thermal conversion member, and discharges the ink by the use of heat energy emitted by said electro-thermal conversion member.

28. An information processing apparatus according to claim 5, wherein said control means cuts off the power source of said apparatus when the temperature detected by said element temperature detecting means is high as compared with a seventh set temperature preset to a level higher than said second set temperature.

29. An information processing apparatus according to claim 6, wherein said control means cuts off the power source of said apparatus when the temperature detected by said element temperature detecting means is high as compared with a seventh set temperature preset to a level higher than said second set temperature.

30. An information processing apparatus according to claim 15, wherein said control means cuts off the power source of said apparatus when the temperature detected by said system temperature detecting means is high as compared with a fifth set temperature preset to a level higher than said first set temperature or when the temperature detected by said element temperature detecting means is high as compared with a sixth set temperature preset to a level higher than said second set temperature.

31. An information processing apparatus according to claim 16, wherein said control means cuts off the power source of said apparatus when the temperature detected by said system temperature detecting means is high as compared with a fifth set temperature preset to a level higher than said first set temperature or when the temperature detected by said element temperature detecting means is high as compared with a sixth set temperature preset to a level higher than said second set temperature.

* * * * *

UNITED STATES PATENT AND TRADEMARK OFFICE
CERTIFICATE OF CORRECTION

PATENT NO. : 5,838,590
DATED : November 17, 1998
INVENTOR(S) : NOBORU SHIMOYAMA ET AL.

It is certified that error appears in the above-identified patent and that said Letters Patent is hereby corrected as shown below:

COLUMN 1

Line 29, "such" (second occurrence) should be deleted;

COLUMN 9

Line 1, "as" should read --an--;

COLUMN 12

Line 32, "not is" should read --is not--;

COLUMN 13

Line 34, after "contained" insert --in--.

Signed and Sealed this

Thirty-first Day of August, 1999

Attest:

Q. TODD DICKINSON

*Attesting Officer*        *Acting Commissioner of Patents and Trademarks*